United States Patent [19]

Valoti et al.

[11] 3,896,093

[45] July 22, 1975

[54] PROCESS FOR THE PRODUCTION OF POLYMERS OF ACRYLONITRILE AND STYRENE AND OF ACRYLONITRILE, STYRENE, AND BUTADIENE

[75] Inventors: GianFranco Valoti; Giancarlo Antonini, both of Milan, Italy

[73] Assignee: Societa' Italiana Resine S.I.R. S.p.A., Milan, Italy

[22] Filed: Dec. 26, 1973

[21] Appl. No.: 428,571

[30] Foreign Application Priority Data
Dec. 22, 1972 Italy.................................. 33447/72

[52] U.S. Cl. ......... 260/80.78; 260/83.3; 260/85.55; 260/821
[51] Int. Cl. .............................. C08d 7/6; C08c 1/4
[58] Field of Search...... 260/821, 83.3, 96 R, 80.78, 260/85.55

[56] References Cited
UNITED STATES PATENTS

| | | | |
|---|---|---|---|
| 2,562,191 | 7/1951 | Howerton | 260/821 X |
| 3,006,872 | 10/1961 | Benedict et al. | 260/821 X |
| 3,249,569 | 5/1966 | Fantl | 260/821 X |

*Primary Examiner*—William F. Hamrock
*Attorney, Agent, or Firm*—Sughrue, Rothwell, Mion, Zinn and Macpeak

[57] ABSTRACT

Process for the recovery of polymers of acrylonitrile and styrene optionally containing butadiene, by coagulation of aqueous latices containing these polymers, which comprises maintaining said aqueous latices in a first coagulation phase, in the presence of a coagulant, at a temperature equal to or up to about 15°C higher than the distortion temperature of the polymer for a time in the range of from about 10 to 100 minutes, and bringing the aqueous mixture obtained in this way into conditions of boiling or close to boiling in a second coagulation phase carried out in at least two stages, the product being maintained in such conditions for a time in the range of from about 10 to 100 minutes in each individual stage.

6 Claims, No Drawings

PROCESS FOR THE PRODUCTION OF POLYMERS OF ACRYLONITRILE AND STYRENE AND OF ACRYLONITRILE, STYRENE, AND BUTADIENE

BACKGROUND OF THE INVENTION

1. Field of the Invention

The present invention relates to an improved process for the production of polymers of acrylonitrile and styrene and of acrylonitrile, styrene, and butadiene. More particularly, the invention relates to a process for the recovery of polymers of acrylonitrile, styrene, and butadiene by coagulation of aqueous latices containing these polymers.

For simplicity, the polymers of acrylonitrile and sytrene will hereinafter be referred to as SAN, and polymers of acrylonitrile, styrene, and butadiene as ABS. It is also to be understood that in said polymers, the styrene and/or the acrylonitrile may be replaced in part by other monomers, such as α-methylstyrene, methacrylonitrile, or alkyl acrylates or methacrylates. It is further to be understood that ABS latices refer to the direct products of the emulsion polymerization of acrylonitrile, butadiene, and styrene, the graft products obtained by polymerization of acrylonitrile and styrene on polybutadiene latices, and the mixtures of SAN latices with the direct products of the emulsion polymerization of acrylonitrile, styrene, and butadiene or with the graft products obtained by polymerization of acrylonitrile and styrene on polybutadiene latices.

2. Description of the Prior Art

Various processes are known for the separation of polymers from latices. The technique most widely used for the purpose consists in the addition of acids, salts, or the like to the latices, at temperatures above room temperature, the mass being kept stirred in such a way as to cause coagulation, and then drying of the coagulum obtained; see Houben-Weyl, Methoden der organischen Chemie, vol. 14/I (1961) 478 ff. This technique has a number of disadvantages of considerable importance, i.e. particularly the formation of final products that are not homogeneous and not sufficiently hardened, and that contain, in particular, an undesirably high percentage of fine powders. For example, the non-homogeneity of the products and the presence of the fine powders cause difficulties in use, as in colouring, and in feeding to the extruders, particularly when the polymers are mixed with the various additives. Moreover, the presence of fine powders causes numerous difficulties in the actual preparation of the polymers, such as blockage of valves, difficulty of filtration and of centrifugation, loss of product in separation and in drying, difficulties in washing and hence poorer characteristics of the final products, and, moreover, additional operations are required, such as recovery and recycling. Finally, if the products are not sufficiently hardened, undesirable agglomerate formation occurs.

Attempts have been made in the art above all to avoid the formation of fine powders, for example by carrying out the coagulation at high temperatures of about 130° to 150°C. This system greatly reduces the formation of fine powders, but leads to very coarse and non-homogeneous coagula which favour agglomeration, blocks, and obstructions, and hence it causes difficulties.

According to another known process, latices of rubber-like polymers are added to the SAN and ABS latices before or during coagulation. However, this system leads to changes in the physicochemical characteristics of the final products, such as mechanical properties, thermal stability, and superficial appearance, and also causes loss of transparency and brilliance of the final products.

Another known process involves the addition of polymeric agglomeration agents, e.g. of the polyethylene oxide type, besides the coagulant; see Encyclopedia of Polymer Science Bd. 6 (1967), p. 142. This system, in addition to the disadvantages resulting from the addition of a foreign component, favours the formation of inclusions and is expensive.

Other systems, which will not be described for simplicity, are of little industrial interest.

SUMMARY

One object of this invention is to provide a process for the recovery of polymers of acrylonitrile, styrene, and butadiene by coagulation of agueous latices containing these polymers, which is devoid of the foregoing disadvantages.

It is a further object of this invention to provide a simple and economical process for the coagulation of aqueous ABS and SAN latices to give sufficiently hardened polymers with uniform and controlled particle size. The foregoing objects and others which will become apparent from the following description are accomplished in accordance with this invention, generally speaking, by providing a process for the recovery of polymers of acrylonitrile and styrene, optionally containing butadiene, by coagulation of aqueous latices containing these polymers, which comprises maintaining said aqueous latices in a first coagulation phase in the presence of a coagulant, at a temperature equal to or up to about 15°C higher than the distortion temperature of the polymer for a time in the range of from about 10 to 100 minutes, and bringing the aqueous mixture obtained in this way into conditions of boiling or close to boiling in a second coagulation phase carried out in at least two stages, the product being maintained in such conditions for a time in the range of from about 10 to 100 minutes in each individual stage.

It has been found that in accordance with the present invention one obtains substantial advantages in the process of the coagulation of ABS and SAN latices, particularly with regard to the absence of fine powders and the uniformity and the degree of hardness of the polymers.

The present invention is based on the discovery that for each individual ABS and SAN latex there is a range of temperatures for the first coagulation phase that allows to obtain surprisingly good results, said temperature range being related to the composition of the ABS and SAN polymers and to the physico-chemical characteristics of said polymers. It is already known that the particle size distribution (granulometry) of the coagula depends essentially on the temperature at which the coagulation is carried out, the particle size increasing with rising temperature.

It has now been found that the increase in particle size becomes distinct at temperatures equal to or slightly higher than the distortion temperature of the polymers with residence times exceeding 10 minutes, and above all, that a uniform and optimum increase is achieved when operating at temperatures equal to the above-mentioned distortion temperature or up to 15°C higher, with residence times exceeding 10 minutes but less than 100 minutes.

It has also been found that to obtain a well hardened coagulum, it is necessary to follow the first coagulation phase with a second phase, carried out in at least two stages, under conditions of boiling or close to boiling of the mass produced in the first phase. This second phase may be carried out in two or more stages, but in every case the residence time in each individual stage must be between about 10 and 100 minutes, and preferably in the range of from about 20 to 40 minutes, while the temperature is normally in the range of from about 90° to 100°C, at atmospheric pressure.

Alternatively, the inventive process may be carried out at elevated pressures, e.g. 1 to 10 atmospheres, preferably 1 to 5 atmospheres.

The best results are obtained by operation in the first phase at a temperature of from about 3° to 8°C above the distortion temperature of the polymer being formed for times of from about 20 to 30 minutes, and in the second phase with times of from about 20 to 40 minutes in two stages, at a temperature in the range of from about 94° to 98°C, at atmospheric pressure.

By the distortion temperature or heat distortion temperature of the polymer being formed we mean that in accordance with the standard ASTM D 648–56 at 264 psi, carried out on injection-moulded specimens measuring 5 inches × ½× ¼inches and conditioned for 24 hours at 50°C.

The physico-chemical characteristics of the polymers, and in particular the distortion temperature, depend significantly on the composition of the polymers themselves. For example, in the case of the ABS with high contents of polybutadiene (from about 30 to 40 percent by weight), the distortion temperatures are about 84° to 88°C, while in the case of the ABS with low polybutadiene contents (from about 12 to 18 percent by weight) they are about 88° to 92°C. In the case of SAN, the distortion temperatures are about 92° to 97°C.

Thus, those skilled in the art, knowing the nature of the latex that is to be subjected to coagulation, can easily determine the temperature conditions for the first coagulation phase that allow the advantages of the process of the present invention to be obtained.

The latices that may be subjected to coagulation in accordance with the invention are obtained by the processes known in the art, which consist essentially in polymerization of the monomer in an aqueous medium in the presence of initiators, emulsifiers, and any other additives. For example, in the case of SAN and ABS obtained directly, acrylonitrile and styrene and acrylonitrile, butadiene, and styrene are polymerized respectively in aqueous emulsion, while in the case of graft ABs, styrene and acrylonitrile are polymerized in the presence of polybutadiene latices. The latices obtained by mixing SAN with ABS formed by direct polymerization or with graft ABS may also be subjected to coagulation in accordance with the present invention.

In any case, in all the latices that can be coagulated in accordance with the present invention, a solids content in the range of from about 25 to 45 percent by weight is obtained.

The process of the present invention can be carried out in conventional stirrer equipment such as reactors of various types with stirrers of the anchor, turbine, or propeller type of various natures.

The latex and the coagulant solution, and possibly dilution water, are fed continuously to the first of said reactors. The suspension obtained overflows into the successive reactors, from which it is discharged and subjected to the usual treatments for the separation and drying of coagula. The coagulation is carried out continuously, with continuous introduction of latex and coagulating solution and discharge of the resulting suspension through an overflow or by other equivalent systems.

According to another embodiment of the present invention the coagulation can be carried out discontinuously. In this case, the coagulant solution is introduced into a boiler, where it is raised to the temperature described above for the first coagulation phase, and the latex is added, the operation being carried out in such a way that the residence time is in the range of from about 10 to 100 minutes. The suspension obtained is discharged into a second reactor, where it is kept for a time of from about 10 to 100 minutes at the temperatures described above for the second coagulation phase.

In a further embodiment, when the first coagulation phase is complete, the second phase is carried out in the same autoclave with the residence times and the temperatures indicated above.

In accordance with the present invention, the coagulation is carried out in the presence of electrolytic coagulants. These coagulants are well known in prior art and do not form part of the present invention. For example, it is possible to use inorganic acids such as hydrochloric acid, sulphuric acid, and the like, organic acids such as formic acid, oxalic acid, acetic acid, and the like, and water-soluble salts such as chlorides, nitrates, sulphates, and acetates of sodium, potassium, calcium, magnesium, zinc, aluminium, and the like. The quantities of electrolytes used vary according to numerous factors, such as the solids content of the latex, the particle size of the latex, the quantity and the type of emulsifying agent in the latex, the particular electrolyte used, and the like. Thus in the case of graft ABS with a solids content of about 30 percent by weight and with particles from 3000 to 4000 A, with emulsifying agents of the fatty acid and rosin acid soap type in a quantity of about 2 percent by weight, using calcium chloride as the electrolyte, the best results are obtained with a concentration of the latter of from about 2.5 to 3.0 percent by weight on the coagulated anhydrous polymer.

By operation in accordance with the present invention, one obtains final products that, after drying, have a particle size distribution of at least 80 percent by weight between 0.1 and 1.0 mm. This particle size distribution is considered optimum for avoiding the disadvantages described earlier.

Moreover, the coagulated products are free from agglomerates and are characterized by a hardness such that no packing and/or impermeabilization phenomena occur during the filtration and/or centrifugation phases.

The invention will now be illustrated by the following examples, which are not intended to limit its scope in any way. In these examples, as in the remainder of the description and in the claims, the percentages indicated are expressed by weight.

EXAMPLE 1

A latex of a styrene-acrylonitrile copolymer having a solids content of 40 percent, a pH of 9.5 and a weight average particle diameter of 800 A, obtained by emulsion copolymerization with 2 percent of Hercules Resinate 214 emulsifier, was used. This copolymer had a monomer composition of 77 percent styrene and 23 percent acrylonitrile and had a distortion temperature (H.D.T.) of 95°C.

4000 l/h of this latex and 6000 l/h of an aqueous 0.75 percent calcium chloride solution were fed separately to a 5m³ autoclave fitted with a corrosion-resistant turbine mixer. The temperature of the autoclave was maintained at 98°C by direct injection of steam at 2.5 atmospheres gauge. The suspension obtained passed by an overflow into another two autoclaves of the same type as the first connected in cascade and fitted with stirrers, heating systems, and overflow discharge also like the first. The temperature in these last two autoclaves was also maintained at 98°C. The new suspension formed was centrifuged and dried.

The polymer obtained had the following particle size distribution:
- residue on a 1.2 mm aperture screen = 0.3 percent
- residue on a 1.0 mm aperture screen = 0.5 percent
- residue on a 0.7 mm aperture screen = 19.1 percent
- residue on a 0.25 mm aperture screen = 40.4 percent
- residue on a 0.1 mm aperture screen = 25.9 percent
- fraction smaller than 0.1 mm aperture = 13.8 percent
- fraction with granulometry between 0.1 and 1 mm = 85.4 percent.

EXAMPLE 2 (Reference Example)

In this example, the styrene-acrylonitrile copolymer latex of Example 1 was used under the same operating conditions except for the temperature in the first coagulation phase, which was lower than the minimum value in accordance with the invention. More precisely, the temperature in the first autoclave was maintained at 90°C, while that in the two subsequent autoclaves was 98°C.

The polymer finally obtained had the following particle size distribution:
- residue on a 1.2 mm aperture screen = 0.1 percent
- residue on a 1.0 mm aperture screen = 0.2 percent
- residue on a 0.7 mm aperture screen = 0.3 percent
- residue on a 0.25 mm aperture screen = 20.4 percent
- residue on a 0.1 mm aperture screen = 47.5 percent
- fraction smaller than 0.1 mm aperture = 31.5 percent
- fraction with granulometry between 0.1 and 1 mm = 68.2 percent.

EXAMPLE 3

The same latex and the same apparatus were used as in Example 1. The temperature in the first autoclave was maintained at 103°C, while that in the two subsequent autoclaves was 98°C. To keep the suspension liquid at 103°C, the autoclave was pressurized with nitrogen at 0.5 atmospheres gauge, this pressure being maintained with the aid of a pressure control regulator. The polymer finally obtained had the following particle size distribution:
- residue on a 1.2 mm aperture screen = 0.3 percent
- residue on a 1.0 mm aperture screen = 0.4 percent
- residue on a 0.7 mm aperture screen = 26.0 percent
- residue on a 0.25 mm aperture screen = 41.5 percent
- residue on a 0.1 mm aperture screen = 19.3 percent
- fraction smaller than 0.1 mm aperture = 12.5 percent
- fraction with granulometry between 0.1 and 1 mm = 86.8 percent

EXAMPLE 4 (Reference Example)

In this example the sytrene-acrylonitrile copolymer of Example 1 was used under the same operating conditions with the exception of the temperature in the first coagulation phase, which was higher than the maximum value in accordance with the invention. More precisely, the temperature in the first autoclave was maintained at 115°C, while that in the two subsequent autoclaves was 98°C.

The polymer finally obtained had the following particle size distribution:
- residue on a 1.2 mm aperture screen = 9.0 percent
- residue on a 1.0 mm aperture screen = 20.4 percent
- residue on a 0.7 mm aperture screen = 38.5 percent
- residue on a 0.25 mm aperture screen = 21.8 percent
- residue on a 0.1 mm aperture screen = 6.5 percent
- fraction smaller than 0.1 mm aperture = 3.8 percent
- fraction with granulometry between 0.1 and 1mm = 66.8 percent.

The coagulated polymer was in a very coarse form and caused blockage of the discharge tubes every 10 to 15 hours, making the continuation of the experiment practically impossible.

EXAMPLE 5 (Reference Example)

In this example, the styrene-acrylonitrile copolymer of Example 1 was used under the same operating conditions with the exception of the temperature in the second coagulation phase, which was lower than the minimum value in accordance with the invention.

More precisely, the temperature in the first autoclave was maintained at 98°C, while that in the two subsequent autoclaves was 85°C.

The polymer obtained had the following particle size distribution:
- residue on a 1.2 mm aperture screen = 0.2 percent
- residue on a 1.0 mm aperture screen = 0.3 percent
- residue on a 0.7 mm aperture screen = 17.5 percent
- residue on a 0.25 mm aperture screen = 33.2 percent
- residue on a 0.1 mm aperture screen = 28.3 percent
- fraction smaller than 0.1 mm aperture = 20.5 percent
- fraction with granulometry between 0.1 and 1 mm = 79 percent.

The coagulum was not found to be hardened sufficiently, and caused blockages every 4 to 5 hours due to impermeabilization of the nets of the centrifuges, and so seriously hindered the work.

EXAMPLE 6

A latex of a terpolymer of acrylonitrile, styrene, and butadiene having a solids content of 30 percent, a pH of 9.5, and a weight average particle diameter of 3400 A, obtained by emulsion polymerization of styrene and acrylonitrile on a polybutadiene latex, with 2 percent of an emulsifier consisting of a mixture of sodium stearate and Hercules Resinate 214, was used. This terpolymer had a monomer composition of 40 percent butadiene, 45 percent styrene, and 15 percent acrylonitrile, and had a distortion temperature of 85°C.

5000 l/h of this latex and 5000 l/h of an aqueous 0.75 percent calcium chloride solution were fed separately to an autoclave as in Example 1. The remainder of the apparatus used was also that already described in Example 1. The operation was thus as in Example 1 with the exception of the temperature in the first autoclave, which was maintained at 93°C, while that in the two subsequent autoclaves was maintained at 98°C.

The polymer obtained after centrifugation and drying had the following particle size distribution:
 residue on a 1.2 mm aperture screen = 0.6 percent
 residue on a 1.0 mm aperture screen = 1.2 percent
 residue on a 0.7 mm aperture screen = 16.0 percent
 residue on a 0.25 mm aperture screen = 57.5
 residue on a 0.1 mm aperture screen = 20.7 percent
 fraction smaller than 0.1 mm aperture = 4.0 percent
 fraction between 0.1 and 1 mm aperture = 94.2 percent

EXAMPLE 7 (Reference Example)

In this example, the ABS terpolymer latex of Example 6 having a high butadiene content was used under the same operating conditions with the exception of the temperature in the first coagulation phase, which was lower than the minimum value in accordance with the invention. More precisely, the temperature in the first autoclave was maintained at 80°C, while that in the two subsequent autoclaves was 98°C.

The polymer obtained had the following particle size distribution:
 residue on a 1.0 mm aperture screen = 1.3 percent
 residue on a 0.7 mm aperture screen = 6.1 percent
 residue on a 0.25 mm aperture screen = 36.7 percent
 residue on a 0.1 mm aperture screen = 28.4 percent
 fraction smaller than 0.1 mm aperture = 27.5 percent
 fraction between 0.1 and 1 mm aperture = 71.2 percent.

EXAMPLE 8 (Reference Example)

In this example, the ABS terpolymer latex of Example 6 having a high butadiene content was used under the same operating conditions with the exception of the temperature in the first coagulation phase, which was higher than the maximum value in accordance with the invention. More precisely, the temperature in the first autoclave was maintained at 110°C, while that in the two subsequent autoclaves was 98°C. To keep the suspension liquid at 110°C, a pressure of 2 atmospheres gauge was applied in the autoclave with nitrogen, this value being maintained with the aid of a pressure control regulator.

The polymer finally obtained had the following particle size distribution:
 residue on a 1.2 mm aperture screen = 18.3 percent
 residue on a 1.0 mm aperture screen = 14.7 percent
 residue on a 0.7 mm aperture screen = 57.5 percent
 residue on a 0.25 mm aperture screen = 4.6 percent
 residue on a 0.1 mm aperture screen = 4.7 percent
 fraction smaller than 0.1 mm aperture = 0.2 percent
 fraction between 0.1 and 1 mm aperture = 66.8 percent.

Afte 10 hours, the operation had to be stopped because of blockage of the pipes resulting from the high formation of agglomerates.

EXAMPLE 9

A latex of a terpolymer of acrylonitrile, styrene, and butadiene having a solids content of 30 percent, a pH of 9.8, and a weight average particle diameter of 3200 A, obtained by emulsion polymerization of styrene and acrylonitrile on polybutadiene latex, with 2 percent of an emulsifier consisting of a mixture of sodium stearate and Hercules Resinate 214, was used. This terpolymer had a monomer composition of 15 percent butadiene, 65 percent styrene, and 20 percent acrylonitrile, and had a distortion temperature of 90°C.

5000 l/h of this latex and 5000 l/h of an aqueous 0.75 percent calcium chloride solution were fed separately to an autoclave as in Example 1. The remainder of the apparatus used was also that described in Example 1. Thus the operation was as in Example 1 with the exception of the temperature in the first autoclave, which was maintained at 100°C, while that in the two subsequent autoclaves was 98°C.

The polymer obtained after centrifugation and drying had the following particle size distribution:
 residue on a 1.2 mm aperture screen = 0.2 percent
 residue on a 1.0 mm aperture screen = 0.6 percent
 residue on a 0.7 mm aperture screen = 29.3 percent
 residue on a 0.25 mm aperture screen = 43.7 percent
 residue on a 0.1 mm aperture screen = 18.9 percent
 fraction smaller than 0.1 mm aperture = 7.3 percent
 fraction between 0.1 and 1 mm aperture = 91.9 percent

EXAMPLE 10 (Reference Example)

In this example, the ABS terpolymer latex of Example 9 having a low butadiene content was used under the same operating conditions with the exception of the temperatures in both the first and the second coagulation phases, which were lower than the respective minimum values in accordance with the invention. More precisely, the temperature was maintained at 80°C both in the first autoclave and in the two subsequent autoclaves.

The polymer obtained had the following particle size distribution:
 residue on a 1.0 mm aperture screen = none
 residue on a 0.7 mm aperture screen = 0.3 percent
 residue on a 0.25 mm aperture screen = 18.5 percent
 residue on a 0.1 mm aperture screen = 50.7 percent
 fraction smaller than 0.1 mm aperture = 30.5 percent
 fraction between 0.1 and 1 mm aperture = 69.5 percent.

The coagulum was found not to be hardened sufficiently and caused blockages every 3 to 4 hours as a result of impermeabilization of the nets of the centrifuges.

What we claim is:

1. A process for the recovery of polymers of acrylonitrile and styrene optionally containing butadiene by coagulation of aqueous latices containing these polymers, which comprises maintaining said aqueous latices, in a first coagulation phase, in the presence of a coagulant selected from the group comprising hydrochloric acid, sulphuric acid, formic acid, oxalic acid, acetic acid, and a water soluble chloride, nitrate, sulphate, or acetate of sodium, potassium, calcium, magnesium, zinc or aluminum, at a temperature between equal to and up to about 15°C higher than the distortion temperature of the polymer for a time in the range of from about 10 to 100 minutes at atmospheric or greater pressure, and bringing the aqueous mixture obtained in this way into conditions of boiling or close to boiling in a second coagulation phase carried out in at least two stages, the product being maintained in such conditions for a time in the range of from about 10 to 100 minutes in each individual stage.

2. A process as recited in claim 1, wherein the operation in the second coagulation phase is carried out at a temperature in the range of from about 90° to 100°C at atmospheric pressure.

3. A process as recited in claim 1, wherein the operation in the first coagulation phase is carried out at a temperature of from 3° to 8°C higher than the distortion temperature of the polymer being formed for times of from 20 to 30 minutes, and in the second coagulation phase in two stages, at a temperature in the range of from about 94° to 98°C, at atmospheric pressure, for times of from about 20 to 40 minutes.

4. A process as recited in claim 1, wherein the coagulation is carried out at elevated pressures.

5. A process as recited in claim 1, wherein aqueous latices of polymers in which styrene and/or acrylonitrile may be replaced in part by α-methylstyrene, methacrylonitrile, or alkyl acrylates or methacrylates are coagulated.

6. A process as recited in claim 1, wherein said coagulant is calcium chloride.

* * * * *